United States Patent
Suzuki et al.

(10) Patent No.: US 7,210,027 B2
(45) Date of Patent: Apr. 24, 2007

(54) PROCESSOR TRANSFERRING MULTIPLE WORKING REGISTER WINDOWS TRANSFERS GLOBAL REGISTERS ONLY FOR SELECT EXCEPTION HANDLING

(75) Inventors: Takashi Suzuki, Kawasaki (JP); Masaki Ukai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 204 days.

(21) Appl. No.: 10/994,401

(22) Filed: Nov. 23, 2004

(65) Prior Publication Data

US 2006/0020777 A1    Jan. 26, 2006

(30) Foreign Application Priority Data

Jul. 26, 2004    (JP)    ............... 2004-217799

(51) Int. Cl.
   G06F 9/48    (2006.01)
(52) U.S. Cl. ..................... 712/228; 712/244
(58) Field of Classification Search .................. None
   See application file for complete search history.

(56) References Cited

U.S. PATENT DOCUMENTS

| | | | | |
|---|---|---|---|---|
| H1291 H | * | 2/1994 | Hinton et al. .................. 712/23 |
| 5,564,031 A | | 10/1996 | Amerson et al. ........... 711/209 |
| 5,737,625 A | | 4/1998 | Jaggar .......................... 712/41 |
| 6,128,728 A | * | 10/2000 | Dowling ...................... 712/228 |
| 6,167,504 A | | 12/2000 | Damron ....................... 712/202 |
| 2003/0074545 A1 | * | 4/2003 | Uhler .......................... 712/228 |
| 2003/0126415 A1 | | 7/2003 | Okawa et al. .............. 712/228 |

FOREIGN PATENT DOCUMENTS

| | | |
|---|---|---|
| JP | 63-271553 | 11/1988 |
| JP | 7-253884 | 10/1995 |
| JP | 7-281897 | 10/1995 |

OTHER PUBLICATIONS

Fiddler et al.; "Software Considerations for Real-Time RISC", Computer Society International Conference (Compcon); Spring Meeting, Los Alamitos, Feb. 26-Mar. 2, 1990, IEEE Comp. Soc. Press; vol. Conf. 35, pp. 274-277.

* cited by examiner

Primary Examiner—Kenneth S. Kim
(74) Attorney, Agent, or Firm—Staas & Halsey LLP

(57) ABSTRACT

In a data processing apparatus using a register window method performing data transmission from a master register to a work register during an exception handling, detecting a trap, discriminating whether or not a data transmission is required for the global registers by the trap, and transmitting data from the master register to the work register for only the global registers if the trap requires transmitting data for the global registers, thereby providing the data processing apparatus performing data transmission to the global registers if the occurring trap requires data for the global registers.

17 Claims, 12 Drawing Sheets

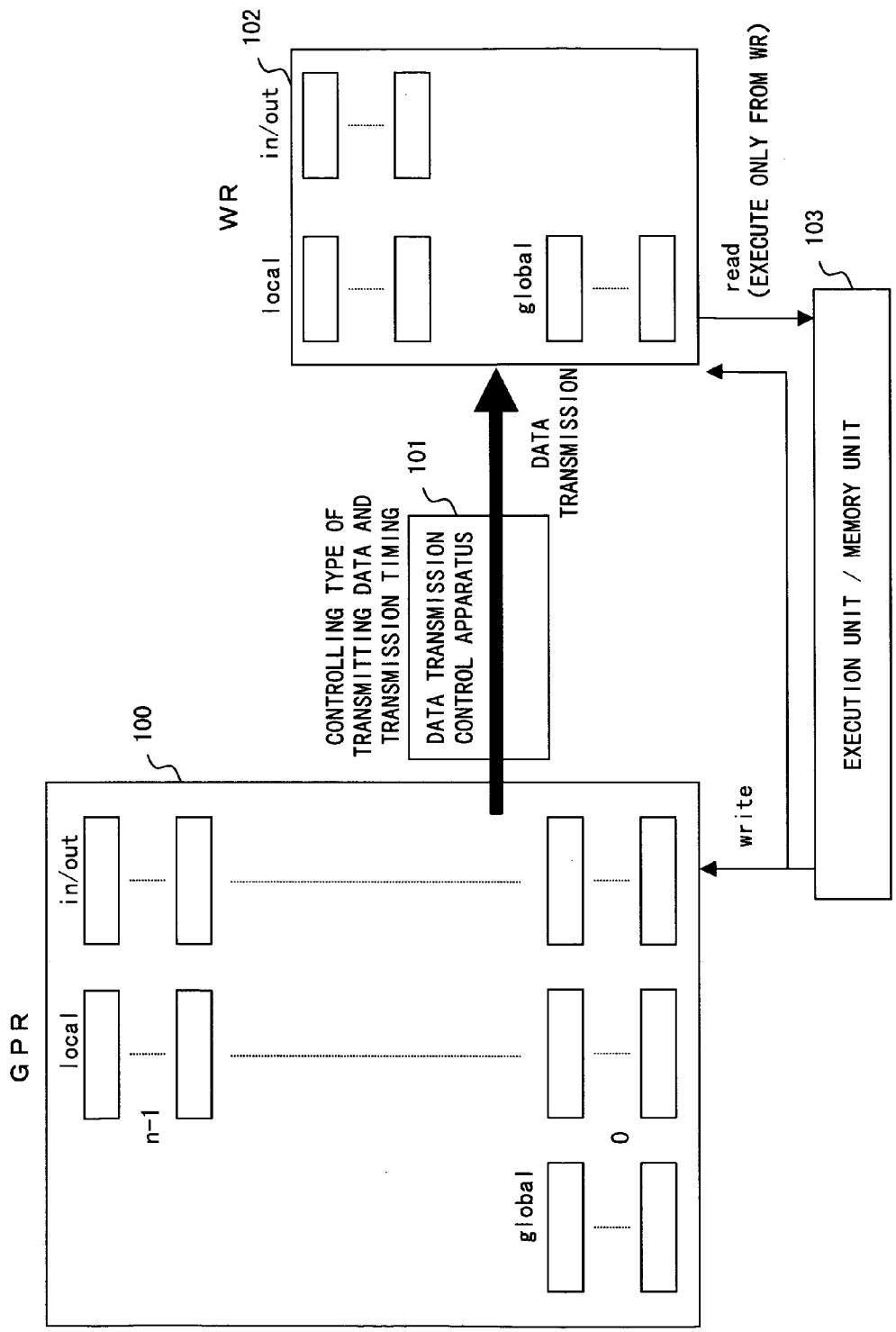

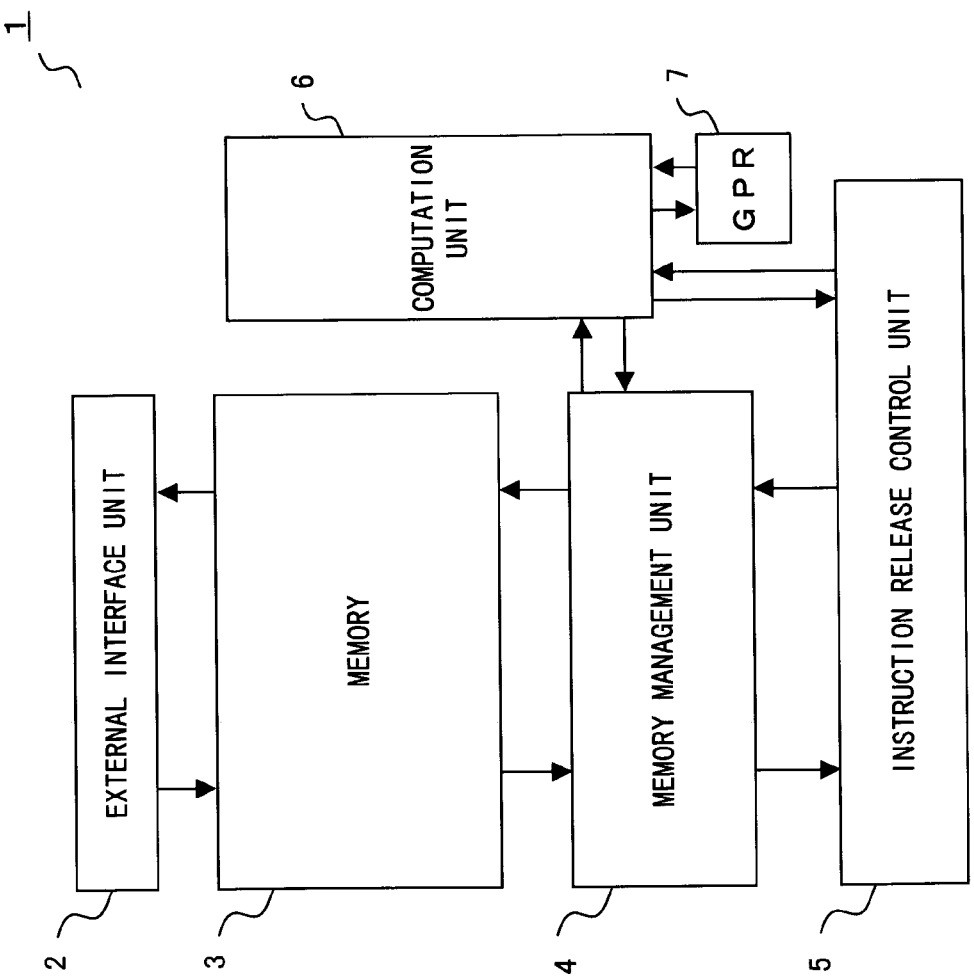
F I G. 2A

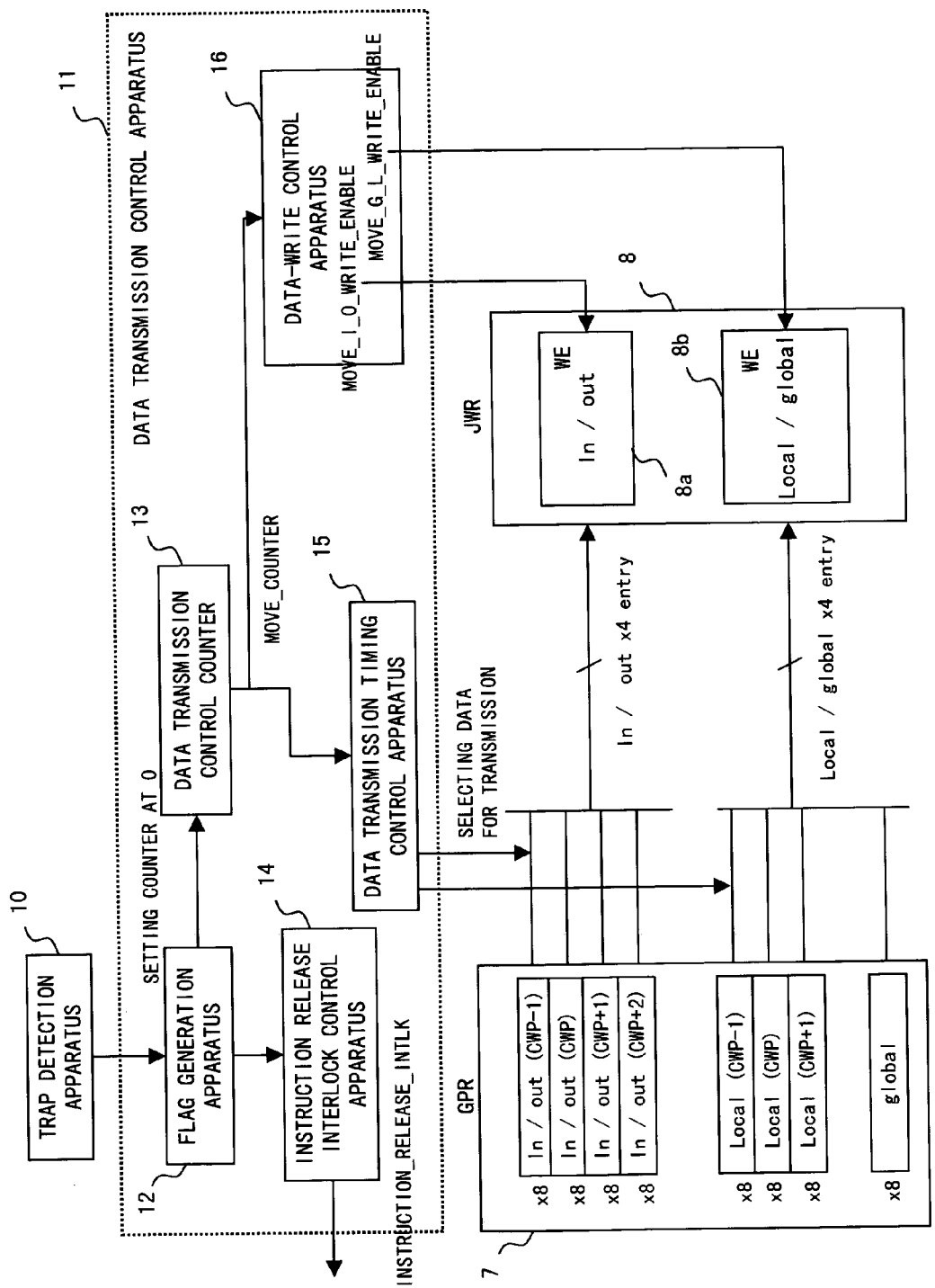
F I G. 2B

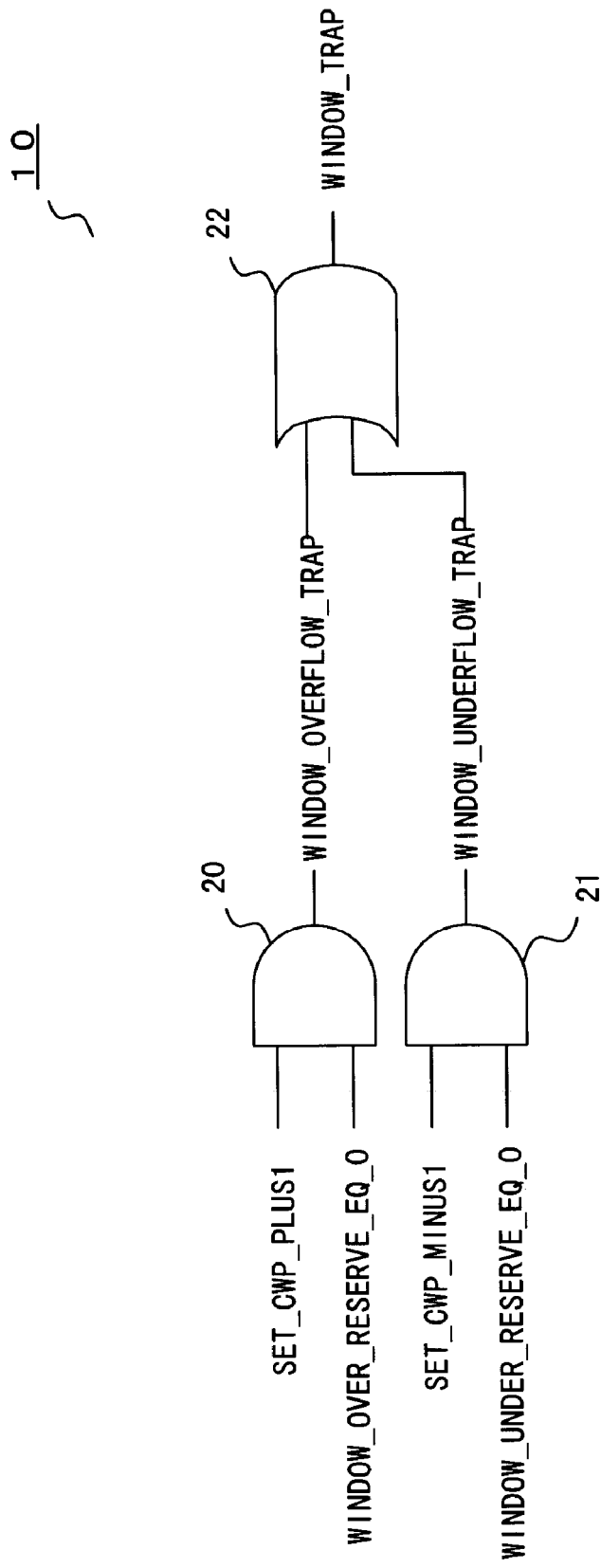
F I G. 3

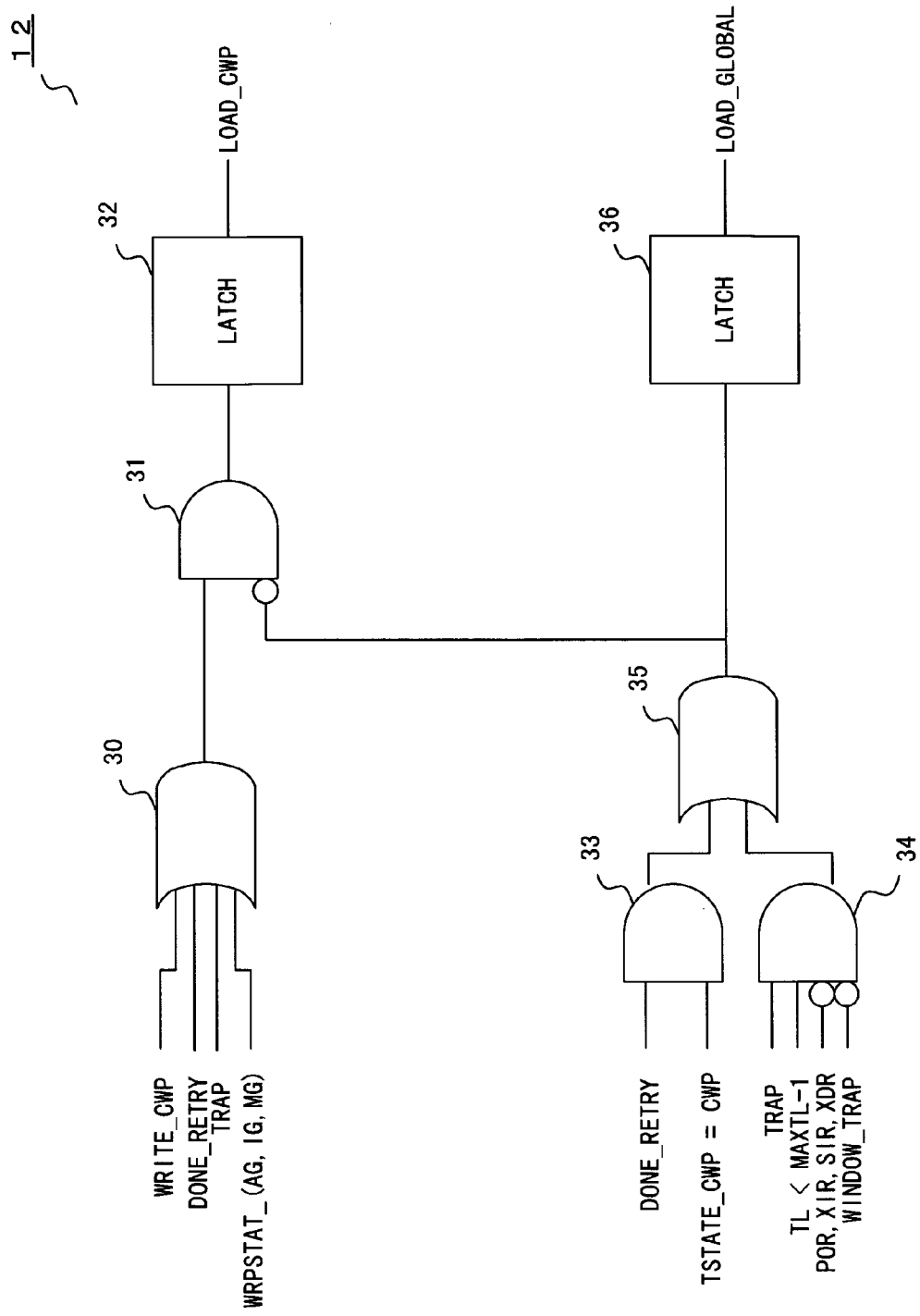
F I G. 4

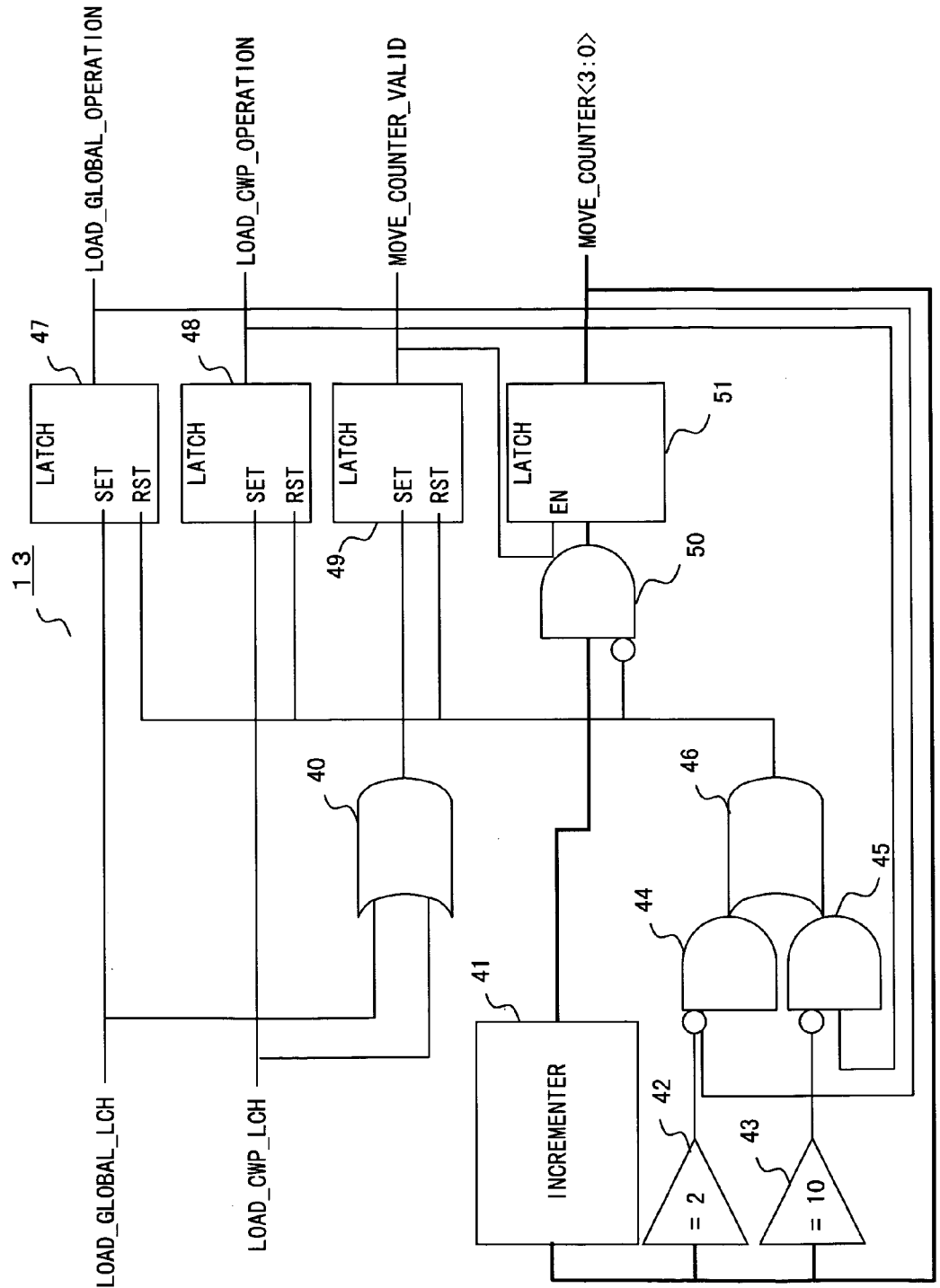
F I G. 5

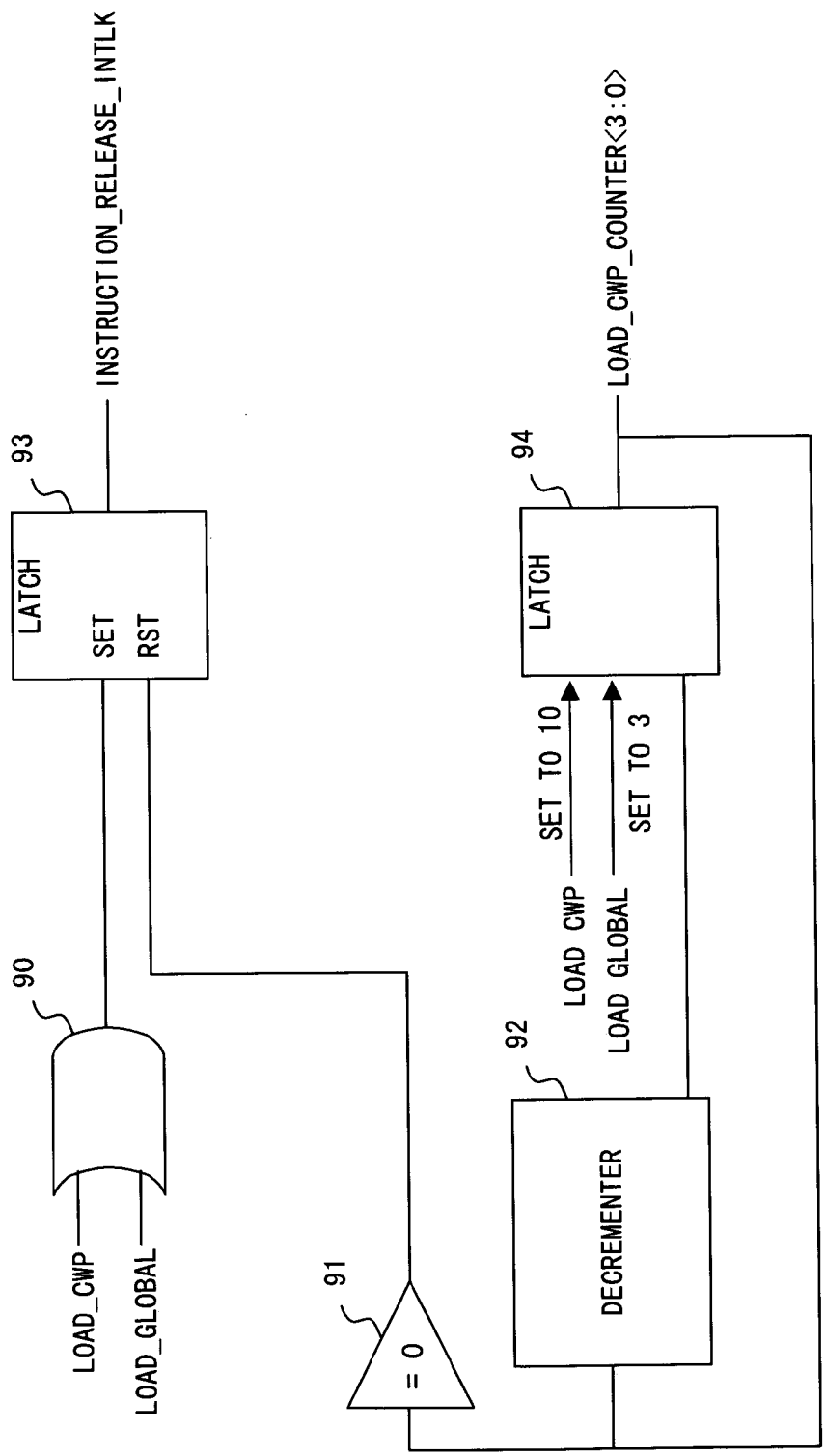
F I G. 8

US 7,210,027 B2

PROCESSOR TRANSFERRING MULTIPLE WORKING REGISTER WINDOWS TRANSFERS GLOBAL REGISTERS ONLY FOR SELECT EXCEPTION HANDLING

BACKGROUND OF THE INVENTION

1. Field of the Invention

The present invention relates to a data processing apparatus, particularly to a data processing apparatus using a register window method, further to such an apparatus and method alleviating an instruction execution interlocking associated with a register reading.

2. Description of the Related Art

Today, with the arrival of an information society, the amount of data to be processed has dramatically increased. Accordingly, the demand for data processing capability has been increasing, and various proposals have been presented for higher processor speeds (for example, Japanese Patent Application Laid-open No. Shou 63-271553, Japanese Patent Application Laid-open No. Hei 07-253884 and Japanese Patent Application Laid-open No. Hei 07-281897).

In recent years, register window methods have been proposed for the architecture of general purpose registers (for example, Japanese Patent Application Laid-open No. Hei 07-253884 and Japanese Patent Application Laid-open No. Hei 07-281897). This method utilizes a plurality of register sets, i.e., register window (hereinafter called "window"), thereby eliminating a necessity of storing a register in a memory or fetching it from the memory, which occurs with calling or returning from a subroutine. However, this method has had a problem in which the data reading of the register by an execution unit cannot be done at a high speed as the number of windows increases dramatically.

Subsequently proposed has been a method in which the read-write time losses stemming from its size or the like are reduced by retaining a currently referred window in a general purpose register (hereinafter called GPR) as a work register, and having the currently referred window perform as a cache.

However, with architecture retaining one currently referred window as the work register, a data transfer to the work registers has to be executed every time the window is switched. In this instance, because there is no data to be referred to, it is impossible to execute a subsequent instruction until a completion of the data transfer.

This constraint ushers in a very significant performance shortfall especially when processing a large number of simultaneous instructions in a data processing apparatus adopting an out-of-order execution method in which an instruction execution order is changed for processing instructions in order of processability, independent of the program execution sequence.

In a data processing apparatus using the out-of-order execution method, many instructions are stored in a buffer and an executable instruction among them is executed in an order altered from the program sequence, thereby improving an instruction throughput.

However, a restraint as described above makes it impossible to alter the instruction sequence before and after a window switching, and therefore all the subsequent instructions stored therein have to be on hold in the buffer, resulting in the out-of-order execution method being non-functional.

In an attempt to solve the problems as described above, a method has been proposed in which a plurality of windows are retained in the work registers as illustrated by FIG. 1A.

FIG. 1A illustrates architecture of a popular register window. A general purpose register window set (GPR) 100 retains n number of (from 0 to n−1, where n>0), i.e., for n number of windows, each containing one local register, one for each in/out register and one global. In the one local register, a plurality of entries are included and so are both in the in/out register and the global register.

The work register (hereinafter called WR) 102 retains k number (where k>0) of windows, each containing one local register (hereinafter called "local"), one for each in/out register (hereinafter called "in/out", "in", or "out") and one global register (hereinafter called "global"). A data transmission control apparatus 101 controls a type of data to be transmitted and its transmission timing in transmission from the GPR to the WR. In the FIG. 1A, the WR can retain data for one window. By this architecture, an execution unit 103 can read out from the work register 102 and therefore the read-out time can be shortened.

FIG. 1B shows a relationship between a popular GPR and JWR. Referring to FIG. 1B, the operation of a jointed window register (hereinafter called JWR) is now described. The general purpose register window set (GPR) 100 is logically connected in a ring and managed by a current window pointer (hereinafter called CWP). Within the GPR (one GPR corresponds to 8 windows in the example as shown in FIG. 1B), a JWR consists of 3 windows, i.e., CWP−1, CWP and CWP+1. And the JWR further retains the global registers which can be used independent of a CWP, a window-specific local register for each window, and the in- and out registers which allow overlapping between windows. Note that one window consists of a local register, an in/out register. Referring to FIG. 1B, for instance, the in 0, local 0 and out 0 constitute one window; the in 1, local 1 and out 1 constitute another window—skipping several windows in between—and likewise the in 7, local 7 and out 7 constitute a yet further window.

Note that the out 0 and the in 1 share the same segment which is shared between the CWP−1 and the CWP windows. Between the out 1 and in 2, the out 2 and in 3, the out 3 and in 4, the out 4 and in 5, the out 5 and in 6, the out 6 and in 7, and the out 7 and in 0 are also as such. Also note that the local is the register which only the current window can refer to. The global is the register which any switched window can refer to.

Further note that the in, and the out, 0 through 7; the local 0 through 7; and the global (consisting of the global for normal 110, the global for MMU 111, the global for interrupt 112 and the global for alternate 113) each has registers for 8 entries.

In FIG. 1B, the area A shows a JWR area corresponding to the CWP being equal to 1, the area B shows an additional JWR area newly required when incrementing from the CWP being equal to 1. A window switching is performed by incrementing or decrementing the CWP, or rewriting with an optional, discrete value.

When incrementing or decrementing the CWP, three windows are featured corresponding to the CWP after its movement. When incrementing, three windows are featured consisting of CWP (the in 1, local 1 and out 1 in the case of FIG. 1B), CWP+1 (the in 2, local 2 and out 2 in the case of FIG. 1B) and CWP+2 (the in 3, local 3 and out 3 in the case of FIG. 1B), while when decrementing, three windows are featured consisting of CWP−2, CWP−1 and CWP.

As two out of the three windows are already retained in the JWR, only one set of data needs to be transmitted from the GPR to the JWR, i.e., the local, the in/out register, for one window being required. By the data transmission control apparatus 101, the data from the GPR 100 to the JWR 102 are transmitted (For instance, a set of data for area B are transmitted for switching from CWP to CWP+1 in the case of FIG. 1B).

As described above, by retaining the window adjacent to the one currently referred to, as the work register set (JWR), the subsequent instruction for continuous window switching can be executed without waiting for the data transmission.

In this instance, the data reading for the post-switching CWP can be executed without waiting for the data transmission from the GPR, hence without a time loss since CWP−1 and CWP+1 are already retained in the JWR.

Now, when rewriting the CWP with an optional discrete value, the post-switching CWP consists of three windows, i.e., CWP−1, CWP and CWP+1. If the CWP is discrete, there is no guarantee for the JWR retaining the data for the post-switching CWP. For this reason, the local, in/out and global registers required for constituting three windows for the post-switching CWP are all transmitted from the GPR to the JWR (namely load_cwp).

In this instance, as it is impossible to execute a data reading for a post-switching CWP, an incrementing or a decrementing the CWP, because the data cannot be referred to, the execution is started for a renewed JWR after a completion of the data transmission.

Also, if a trap (described below) occurs during a process switching or process execution, requiring a value or an operation which the normal operation does not depend on, or needing to retain the register values at the time of the trap occurrence for restarting the processing, a trap processing is executed by switching the global register 110, i.e., the global for normal, to a trap processing-specific register (while the in/out and local are referred to, for apart the normal operation depends on).

The global registers are disposed for trap processing, i.e., a register (global for MMU (memory management unit)) 111 for processing an error occurring at memory access, a register (global for interrupt) 112 for processing an interrupt commanded by software and a register (global for alternate) 113 for other trap processing.

And, after completing a trap processing, global registers are switched from the trap processing registers to the normal processing registers, and the normal processing is resumed.

Now, a trap is described as follows. A trap in other words is an exception handling in which, if another event occurs during the normal processing, the normal processing is interrupted for solving the event, and then the normal processing will be resumed upon solving it. For example, an error occurs during the normal processing requiring a repetition of the processing or a data correction.

Referring to FIG. 1B, data are written in an initialized GPR by switching windows, a repetition of which makes a certain threshold to be reached, resulting in the window going around one turn and all the registers becoming full. In this instance, a further switching the window destroys the data already written therein. In such a case, the windows will be opened and then reassigned by transferring the written data to the main memory. Such a trap occurrence at window switching is called "window-trap."

Switching a JWR at a trap occurrence either accompanies a CWP change, or does not accompany a CWP change but only requires switching the global registers. In an event of executing a reset, all the data in the JWR are cleared for initialization, and therefore all the register data including a set of CWPs must be transmitted from the GPR.

Also, as described above, at a trap occurrence stemming from a window operation (window-trap) such as a situation in which the window being transferred thereto has gone around one turn and hence become inoperable, a trap processing must be done for that window, necessitating switching the CWP along with the global registers.

However, at a trap occurrence except for the above described, since a CWP change is not done at the trap processing, what required basically for transmitting to the JWR are only for the global registers. Currently, however, since the whole data, i.e., the local, in/out and the global registers, for three windows have been transmitted through the load-cwp at all the discrete register switching including a trap, extraneous cycles are required for transmitting the essentially unnecessary data at a trap occurrence in need of no CWP change.

Generally, because a normal operation corresponding to an instruction execution after a trap occurrence cannot be guaranteed without a necessary set of data assembled, a subsequent instruction execution must be suspended (hereinafter called "interlocked") until a completion of the data loading. Such time for suspending (hereinafter called "interlocking") the instruction execution has been ill affecting the CPU performances.

SUMMARY OF THE INVENTION

The purpose of the present invention is to provide an apparatus which transmits the essential data only. That is, the present invention presents an additional apparatus enabling a transmission of data for a global register by watching trap situations and identifying the cases in which the global register values are only required, from among those cases a load-cwp processing is performed.

Also, in this instance, the load-cwp is interlocked from transmitting unnecessary data. As such, the amount of transmitted data is reduced, thereby improving the execution cycle for data transmission.

A data processing apparatus using a register window method performing data transmission from a master register to a work register during an exception handling according to the present invention, comprising:

an acquisition unit for acquiring exception handling occurrence information indicating an occurrence of exception handling;

a discrimination unit for discriminating the information on the exception handling occurrence information; and a transmission control unit for controlling a predefined data transmission based upon a discrimination result by the discrimination unit.

Also, in the data processing apparatus according to the present invention, wherein the discrimination unit discriminates, based upon the exception handling occurrence information, whether or not switching a window, or initializing the work register, is required by the exception handling.

Further, in the data processing apparatus according to the present invention, wherein the transmission control unit, based upon the discrimination result, transmits only a predefined data if switching a window, or initializing said work register, is not required by the exception handling.

Furthermore, a data transmission control method for a data processing apparatus using a register window method controlling data transmission from a master register to a work register during an exception handling according to the present invention, comprising:

acquiring exception handling occurrence information indicating an occurrence of exception handling;

discriminating the exception handling occurrence information; and controlling transmission of predefined data based upon the discrimination result.

BRIEF DESCRIPTION OF THE DRAWINGS

FIG. 1A illustrates architecture of a typical register window;

FIG. 2A illustrates a schematic diagram of a processor according to the present embodiment;

FIG. 2B illustrates a schematic diagram of a data transmission control apparatus according to the present embodiment;

FIG. 3 illustrates a trap detection apparatus 10 according to the present embodiment;

FIG. 4 illustrates architecture of a flag generation apparatus 12 according to the present embodiment;

FIG. 5 illustrates architecture of a data transmission control counter 13 according to the present embodiment;

FIG. 8 illustrates an instruction release interlock control apparatus 14 according to the present embodiment;

DESCRIPTION OF THE PREFERRED EMBODIMENTS

Figure 1B:
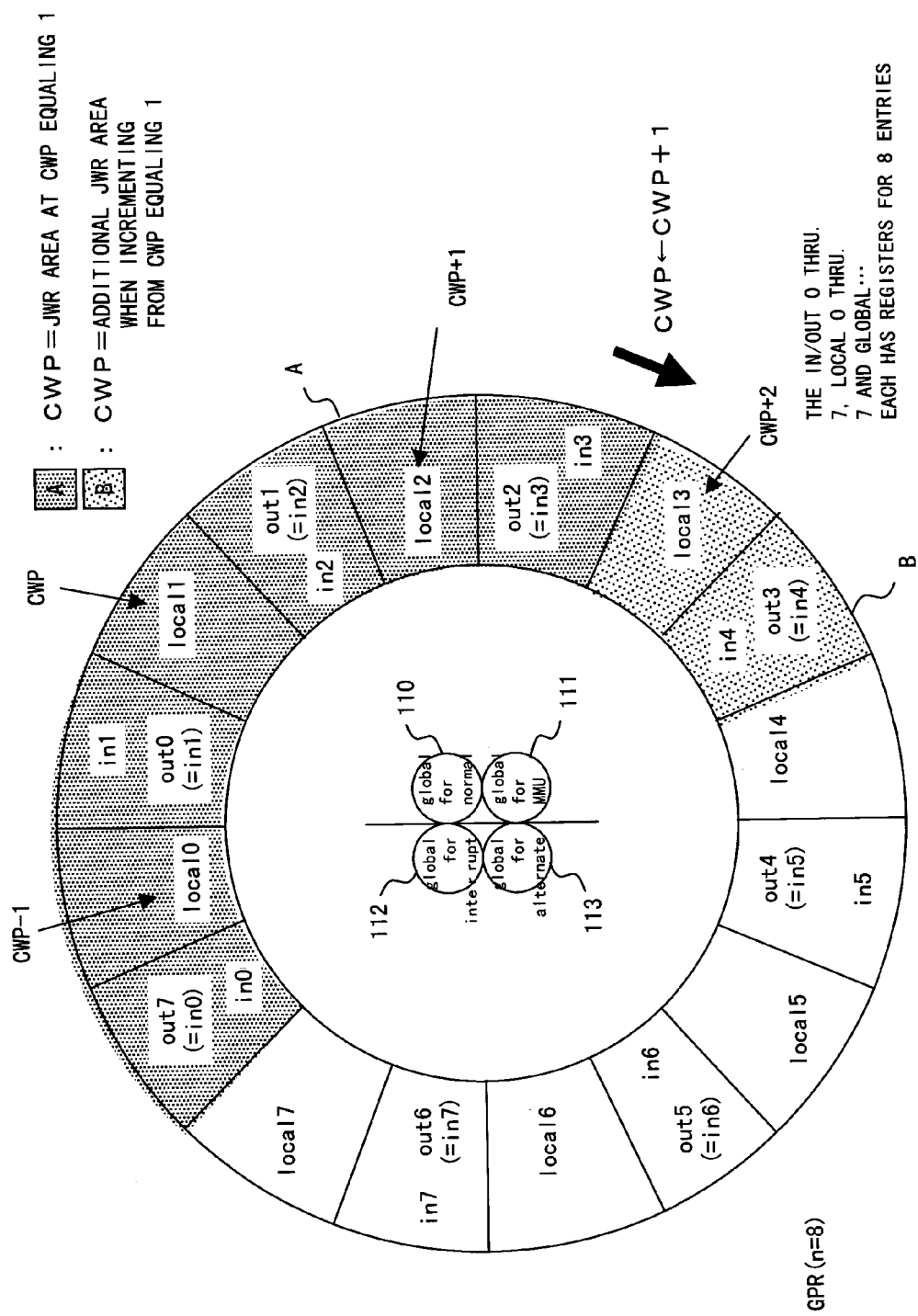
FIG. 1B illustrates a relation chart between a typical GPR and JWR.

In the present invention, in transmitting data from the GPR to the JWR, if "a trap other than window-trap" or "a trap other than a reset" is detected, that is, a trap only requiring a transmission of the global register values, then only data for the global register are transmitted. This eliminates a transmission of essentially unnecessary data thus shortening time for interlocking instruction to the execution unit.

A preferred embodiment of the present invention is now described as follows.

FIG. 2A illustrates a schematic diagram of a processor according to the present embodiment. A processor 1 consists of an external interface unit 2, a memory 3, a memory management unit 4, an instruction release control unit 5, a computation unit 6 and a GPR 7.

The external interface unit 2 manages input and output signals with outside of the processor. The memory 3 is a cache within the processor. The memory management unit 4 manages the memory 3. The instruction release control unit 5 decodes the codes issued by the memory management unit 4 and controls an instruction release for executing each processing. The computation unit 6 performs computation and the like based upon the operand supplied by the memory management unit 4.

FIG. 2B illustrates a schematic diagram of a data transmission control apparatus according to the present embodiment. A data transmission control apparatus 11 controls a data transmission from the GPR 7 to the JWR 8, controlling types of data to be transmitted, the transmission timing, and so on. The data transmission control apparatus 11 is located in the instruction release control unit 5 shown in FIG. 2A.

The data transmission control apparatus 11 consists of a flag generation apparatus 12, a data transmission control counter 13, an instruction release interlock control apparatus 14, a data transmission timing control apparatus 15 and a data writing control apparatus 16. In addition, the data transmission control apparatus 11 receives trap information detected by a trap detection apparatus 10. Note that the trap detection apparatus 10 represents all the apparatuses detecting a trap while residing in various apparatuses such as the memory management unit 4 and the computation unit 6.

In the present embodiment, the JWR 8 consists of a local (8 entries multiplied by 3) 8a, an in/out (8 entries multiplied by 4) and a global (8 entries multiplied by 1) 8b, totaling 64 entries. And a bus is disposed for a data transmission from the GPR to the JWR, i.e., 4 entries for the in/out and 4 entries for the local/global, for a total of 8 entries. Therefore, it is capable of transmitting data amounting 8 entries per cycle.

First, if a trap is detected by the trap detection apparatus 10, the detected information is sent to the flag generation apparatus 12. In the flag generation apparatus 12, a flag is generated corresponding to a trap type. Once a flag is generated by the flag generation apparatus 12, an instruction release interlocking control is initiated by the instruction release interlock control apparatus 14, and a command from the execution unit is interlocked if a data has been transmitted from the GPR to the JWR.

Also, once a flag is generated by the flag generation apparatus 12, the data transmission control counter 13, upon receiving the flag, sets its counter (MOVE_COUNTER) to 0 (zero) and then counts the number of cycles required for transmitting data corresponding to the flag. In the data transmission timing control apparatus 15, a data for transmitting from the GPR 7 to the JWR 8 is selected based upon the counter (MOVE_COUNTER) through the data transmission control counter 13, and the data is transmitted at a predefined timing. In the data writing control apparatus 16, a control is done for enabling the transmitted data from the GPR to write (WE for Write Enable) in the JWR, based upon the counter (MOVE_COUNTER) controlled by the data transmission control counter 13. The signal for controlling writing in the in/out registers 8a is MOVE_I_O_WRITE_ENABLE, while the signal for controlling writing in the local/global registers 8b is MOVE_G_L_WRITE_ENABLE.

Figure 9:
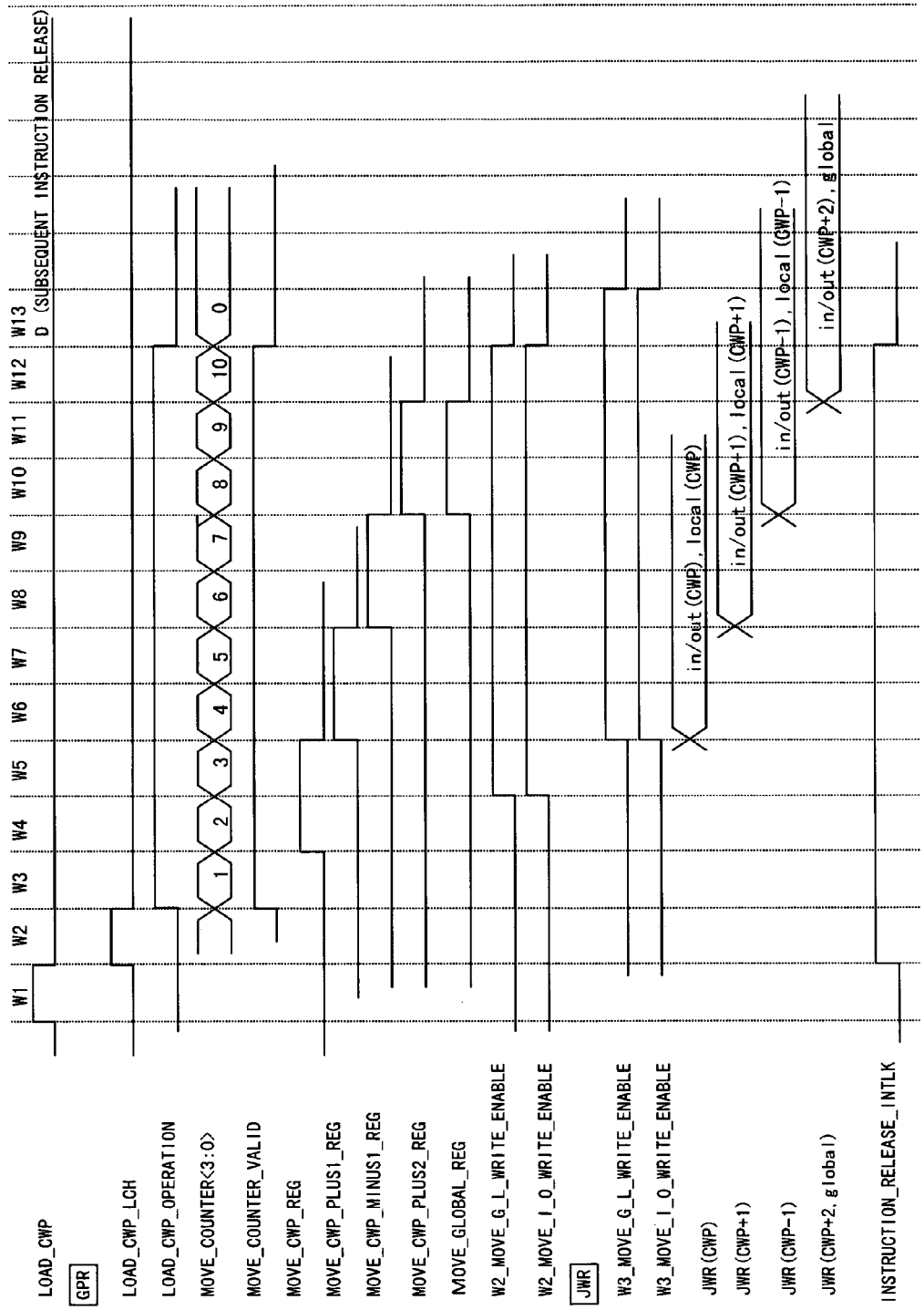
FIG. 9 shows a time chart for transmitting data from GPR to JWR at LOAD_CWP issuance according to the present embodiment.
Figure 10:
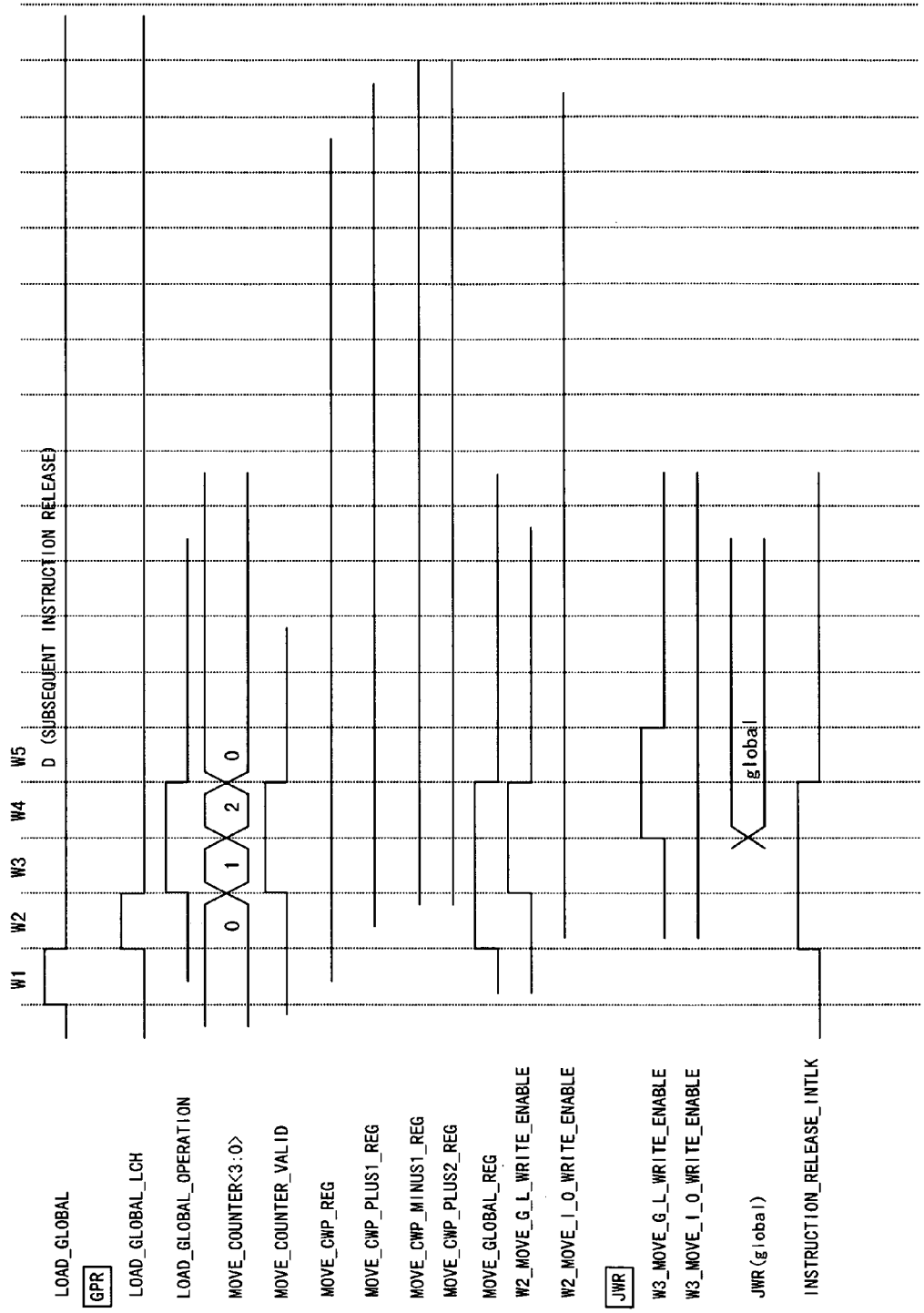
FIG. 10 shows a time chart for transmitting data from GPR to JWR at LOAD_GLOBAL issuance according to the present embodiment.

FIG. 3 illustrates a trap detection apparatus 10. FIGS. 4 through 8 illustrate architecture of each apparatus constituting the data transmission control apparatus 11. FIG. 9 shows a time chart for transmitting data from GPR to JWR at LOAD_CWP issuance. FIG. 10 shows a time chart for transmitting data from GPR to JWR at LOAD_GLOBAL issuance. Referring to FIGS. 9 and 10, each figure is described as follows.

FIG. 3 illustrates a trap detection apparatus 10 according to the present embodiment. The trap detection apparatus 10, while showing an example of trap detection apparatuses, is for detecting the window-trap from among a number of traps.

The trap detection apparatus 10 consists of AND circuits 20, 21, and an OR circuit 22. In the AND circuit 20, SET_CWP_PLUS1 signal (a signal for moving the CWP by one increment toward the plus direction) and WINDOW_OVER_RESERVE_EQ_0 signal (a signal being generated if no area is being reserved in the register just moved to when the CWP is moved by one increment toward the plus direction) are inputted, and the logical product of the two signals, WINDOW_OVERFLOW_TRAP (a signal if windows overlapping with an area in which data is written when the CWP is moved by one increment toward the plus direction), is outputted therefrom.

In the AND circuit 21, SET_CWP_MINUS 1 signal (a signal for moving the CWP by one increment toward the minus direction) and WINDOW_UNDER_RESERVE_EQ_0 signal (a signal being generated if no area is being reserved in the register just moved to when the CWP is moved by one increment toward the minus direction) are inputted, and the logical product of the two signals, WINDOW_UNDERFLOW_TRAP (a signal if windows overlapping with an area in which data is written when the CWP is moved by one increment toward the minus direction), is outputted therefrom.

In the OR circuit 22, WINDOW_OVERFLOW_TRAP signal and WINDOW_UNDERFLOW_TRAP signal are inputted, and the logical sum of the two signals, WINDOW_TRAP signal, is outputted therefrom.

FIG. 4 illustrates architecture of a flag generation apparatus 12 according to the present embodiment. The flag generation apparatus 12 is an apparatus generating either flag, LOAD_GLOBAL or LOAD_CWP, corresponding to a detection result by the trap detection apparatus 10. Among the processing executing LOAD_CWP, the cases in which a CWP switching is not required include a window-trap, a trap occurrence except for a reset and a return from these trap processing to the normal processing. In these cases, LOAD_CWP is interlocked by a signal indicating an occurrence of such event and a new flag, LOAD_GLOBAL, is raised. The flag generation apparatus 12 is now described as follows.

The flag generation apparatus 12 consists of an OR circuit 30, a logic circuit (an AND circuit equipped with an inverter at one of input terminals thereof) 31, a latch circuit 32, an AND circuit 33, a logic circuit (an AND circuit equipped with inverters at two of four input terminals thereof) 34, an OR circuit 35 and a latch circuit 36.

In the OR circuit 30, signals, WRITE_CWP (a signal generated at switching CWP), TRAP (a signal generated at a trap detection), DONE_RETRY (a signal generated at returning from a trap processing), WRPSTAT_(AG, IG, MG) (a signal generated at switching processing condition. Specifically, switching to AG (global for alternate), IG (global for interrupt) and MG (global for MMU)) are inputted, and the logical sum of these signals are outputted therefrom.

The logic circuit 34 is a circuit detecting a trap in which a window switching does not occur. In the logic circuit 34, a TRAP signal; POR, XIR, SIR and XDR signals (these are signals resetting the processing and window itself) signals; a signal generated when TL<MAXTL−1; and WINDOW_TRAP are inputted, and the logical product of these signals is outputted therefrom. Of these signals described above, POR, XIR, SIR and XDR; and WINDOW_TRAP are inputted to the logic circuit 34 by way of the inverter.

TL<MAXTL−1 is described here as follows. The TL is a signal indicating a trap level, i.e., a signal indicating the number of trap occurrences. The MAXTL is a predefined maximum value for the trap level. With this definition, and under the condition of TL<MAXTL−1, a logic high is inputted to the logic circuit 34 (the purpose of the signal is for generating LOAD when TL<MAXTL−1, whereas scrapping all the register values and redoing the processing when TL≧MAXTL−1).

In the AND circuit 33, DONE_RETRY signal and a signal generated when TSTATE_CWP is equal to CWP are inputted, and the logical product of these signals is outputted therefrom. Note that TSTATE_CWP is a signal indicating the condition being in a trap. A signal indicating the case in which TSTATE_CWP being equal to CWP is that a condition of CWP is the same as before the trap occurrence (that is, a window switching did not happen at the trap occurrence).

In the OR circuit 35, output signals from the AND circuit 33 and the logic circuit 34 are inputted, and the logical sum of these signals are outputted therefrom. In the logic circuit 31, an output signal from the AND circuit 30 and an output signal from the OR circuit 35 by way of the inverter are inputted, and the logical product of these signals is outputted therefrom.

In the latch circuit 32, an output signal from the logic circuit 31 is inputted, and LOAD_CWP signal is outputted therefrom. In the latch circuit 36, an output signal from the OR circuit 35 is inputted, and LOAD_GLOBAL signal is outputted therefrom.

As described above, by contriving the flag generation apparatus 12, LOAD_CWP is made logic high at a trap occurrence requiring a CWP change corresponding to switching JWP (a trap other than window-trap) or at executing a reset (refer to FIG. 9).

Alternatively, LOAD_GLOBAL is made logic high at a trap occurrence requiring no CWP change corresponding to switching JWP (a trap other than window-trap) or at a trap other than executing a reset (refer to FIG. 10).

As such, the data transmission from the GPR to JWR is also operated by the both flags.

FIG. 5 illustrates architecture of a data transmission control counter 13 according to the present embodiment. The data transmission control counter 13 has a counter which starts counting up from the cycle when either flag LOAD_GLOBAL or LOAD_CWP is raised.

The data transmission control counter 13 consists of OR circuits 40 and 46; an incrementer 41; comparators 42 and 43; a logic circuit (an AND circuit equipped with an inverter at one of input terminals thereof) 44; a logic circuit (an AND circuit equipped with an inverter at one of input terminals thereof) 45; latch circuits 47, 48, 49 and 51; and a logic circuit (an AND circuit equipped with an inverter at one of input terminals thereof) 50. The wires (those thick lines delineated in FIG. 5) connecting the incrementer 41, the logic circuit 50, the latch circuit 51 and the comparators 42 and 43 are 4-bit signal wires.

When LOAD_GLOBAL_LCH signal (a signal becoming logic high corresponding to LOAD_GLOBAL) is inputted to the latch circuit 47, LOAD_GLOBAL_OPERATION signal (a signal indicating that a data is being transmitted to the GLOBAL registers) becomes logic high, and becomes logic low upon receiving a signal outputted from the OR circuit 46.

When LOAD_CWP_LCH signal (a signal becoming logic high corresponding to LOAD_CWP) is inputted to the latch circuit 48, LOAD_CWP_OPERATION signal (a signal indicating that a data is being transmitted to the CWP registers) becomes logic high, and becomes logic low upon receiving a signal outputted from the OR circuit 46.

In the OR circuit 40, LOAD_GLOBAL_LCH and LOAD_CWP_LCH signals are inputted and the logic sum of these signals is outputted therefrom. This output signal is then inputted to the latch circuit 49 and thereby MOVE_COUNTER_VALID signal (a signal for validating the below described MOVE_COUNTER so as to make the MOVE_COUNTER count up the predefined number of cycles) becoming logic high.

The incrementer 41 is an apparatus incrementing itself cycle by cycle. In the logic circuit 50, a signal outputted from the incrementer 41 and a signal outputted from the OR circuit 46 byway of the inverter are inputted, and the logical sum of these signals is outputted therefrom.

In the latch circuit 51, if a signal outputted from the latch circuit 49 is logic high, a signal outputted from the logic circuit 50 is outputted as MOVE_COUNTER<3:0> signal (a signal for counting the number of cycles during the time when MOVE_COUNTER_VALID is logic high). Whereas, if a signal outputted from the latch circuit 49 is logic low, then MOVE_COUNTER<3:0> signal low is outputted therefrom.

The comparator 42 outputs a logic high if MOVE_COUNTER is equal to 2, otherwise outputs a logic low. The comparator 43 outputs a logic high if MOVE_COUNTER is equal to 10, otherwise outputs a logic low. The MOVE_COUNTER being equal to 2, and being equal to 10, are the numbers of cycles necessary for a data transmission after LOAD_GLOBAL_LCH and LOAD_CWP_LCH becoming logic high, respectively, where these numbers are predefined.

In the logic circuit 44, a signal outputted from the comparator 42 by way of the inverter and a signal outputted from the latch circuit 47 are inputted, and the logical product of these signals is outputted therefrom. In the logic circuit 45, a signal outputted from the comparator 43 by way of the inverter and a signal outputted from the latch circuit 48 are inputted, and the logical product of these signals is outputted therefrom. In the OR circuit 46, signals outputted from the logic circuit 44 and 45 are inputted, and the logical sum of these signals is outputted therefrom.

By contriving as above described, in the case of LOAD_CWP, the LOAD_CWP_OPERATION and the MOVE_COUNTER_VALID maintain logic high for 10 cycles between the cycles W3 and W12 (per MOVE_COUNTER<3:0>), as shown in FIG. 9.

While in the case of LOAD_GLOBAL, the LOAD_GLOBAL_OPERATION and the MOVE_COUNTER_VALID maintain logic high for 2 cycles between the cycles W3 and W4 (per MOVE_COUNTER<3:0>), as shown in FIG. 10.

Figure 6:
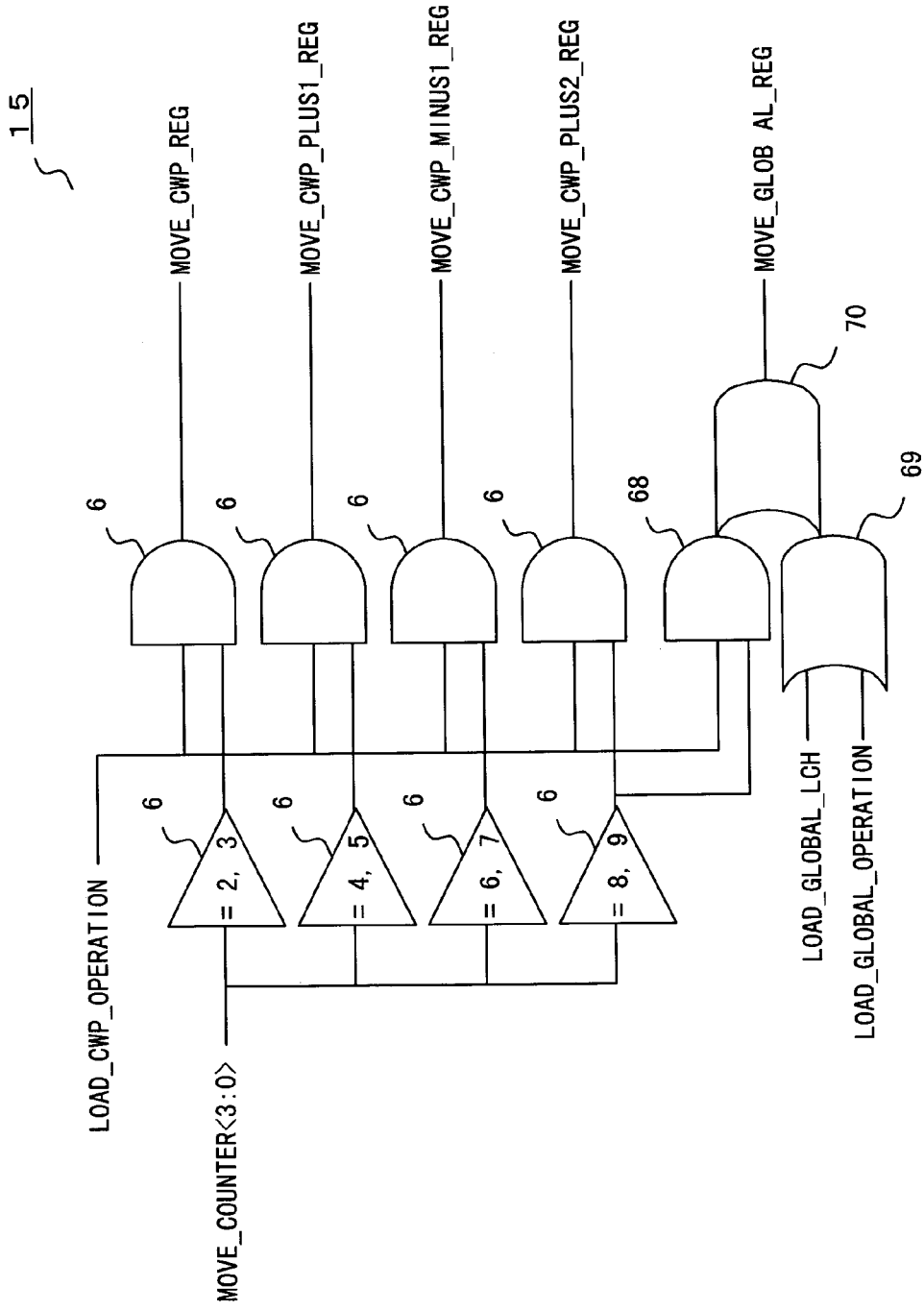
FIG. 6 illustrates a data transmission timing control apparatus 15 according to the present embodiment.

FIG. 6 illustrates a data transmission timing control apparatus 15 according to the present embodiment. In the data transmission timing control apparatus 15, the data transmission timing for each register is controlled. Specifically, in the data transmission timing control apparatus 15, output controls are performed for MOVE_CWP_REG signal (a signal for transmitting data to CWP registers), MOVE_CWP_PLUS 1_REG signal (a signal for transmitting data to CWP+1 registers), MOVE_CWP_MINUS 1_REG signal (a signal for transmitting data to CWP−1 registers), MOVE_CWP_PLUS 2_REG signal (a signal for transmitting data to CWP−2 registers), and MOVE_GLOBAL_REG signal (a signal for transmitting data to GLOBAL registers).

The data transmission timing control apparatus 15 consists of comparators 60, 61, 62 and 63; AND circuits 64, 65, 66, 67 and 68; and OR circuits 69 and 70.

In the comparators 60, 61, 62 and 63, MOVE_COUNTER<3:0> is inputted. In the comparator 60, if MOVE_COUNTER<3:0> is equal to 2 and 3, logic high is outputted therefrom, otherwise logic low is outputted therefrom. In the comparator 61, if MOVE_COUNTER<3:0> is equal to 4 and 5, logic high is outputted therefrom, otherwise logic low is outputted therefrom. In the comparator 62, if MOVE_COUNTER<3:0> is equal to 6 and 7, logic high is outputted therefrom, otherwise logic low is outputted therefrom. In the comparator 63, if MOVE_COUNTER<3:0> is equal to 8 and 9, logic high is outputted therefrom, otherwise logic low is outputted therefrom.

In the AND circuit 64, LOAD_CWP_OPERATION signal and a signal outputted from the comparator 60 are inputted, and the logical product of these signals (MOVE_CWP_REG signal) is outputted therefrom. In the AND circuit 65, LOAD_CWP_OPERATION signal and a signal outputted from the comparator 61 are inputted, and the logical product of these signals (MOVE_CWP_PLUS 1_REG signal) is outputted therefrom. In the AND circuit 66, LOAD_CWP_OPERATION signal and a signal outputted from the comparator 62 are inputted, and the logical product of these signals (MOVE_CWP_MINUS 1_REG signal) is outputted therefrom. In the AND circuit 67, LOAD_CWP_OPERATION signal and a signal outputted from the comparator 63 are inputted, and the logical product of these signals (MOVE_CWP_PLUS 2_REG signal) is outputted therefrom.

In the AND circuit 68, LOAD_CWP_OPERATION signal and a signal outputted from the comparator 63 are inputted, and the logical product of these signals is outputted therefrom. In the OR circuit 69, LOAD_GLOBAL_LCH signal and LOAD_GLOBAL_OPERATION signal are inputted, and the logical sum of these signals is outputted therefrom. In the OR circuit 70, a signal outputted from the AND circuit 68 and a signal outputted from the OR circuit 69 are inputted, and the logical sum of these signals (MOVE_GLOBAL_REG) is outputted therefrom.

By contriving as described above, in the case of LOAD_CWP, as shown in FIG. 9, the data transmission control signal for CWP window, MOVE_CWP_REG, becomes logic high during the cycles W4 and W5 (MOVE_COUNTER_<3:0> being equal to 2, and 3).

And during the cycles W6 and W7 (MOVE_COUNTER_<3:0> being equal to 4, and 5), the data transmission control signal for CWP+1 window, MOVE_CWP_PLUS 1_REG becomes logic high.

And during the cycles W8 and W9 (MOVE_COUNTER_<3:0> being equal to 6, and 7), the data transmission control signal for CWP−1 window, MOVE_CWP_MINUS 1_REG becomes logic high.

And during the cycles W10 and W11 (MOVE_COUNTER_<3:0> being equal to 8, and 9), the data transmission control signal for CWP+2 window, MOVE_CWP_PLUS 2_REG, and the data transmission control signal for GLOBAL registers, MOVE_GLOBAL_REG, become logic high.

In the case of LOAD_GLOBAL on the other hand, as shown in FIG. 10, since LOAD_CWP_OPERATION does not occur, the MOVE_CWP_REG, MOVE_CWP_PLUS 1_REG, MOVE_CWP_MINUS 1_REG, and MOVE_CWP_PLUS 2_REG maintain logic low, whereas the data transmission control signal for GLOBAL registers, MOVE_GLOBAL_REG, become logic high (during the cycles W2 through W4).

Figure 7:
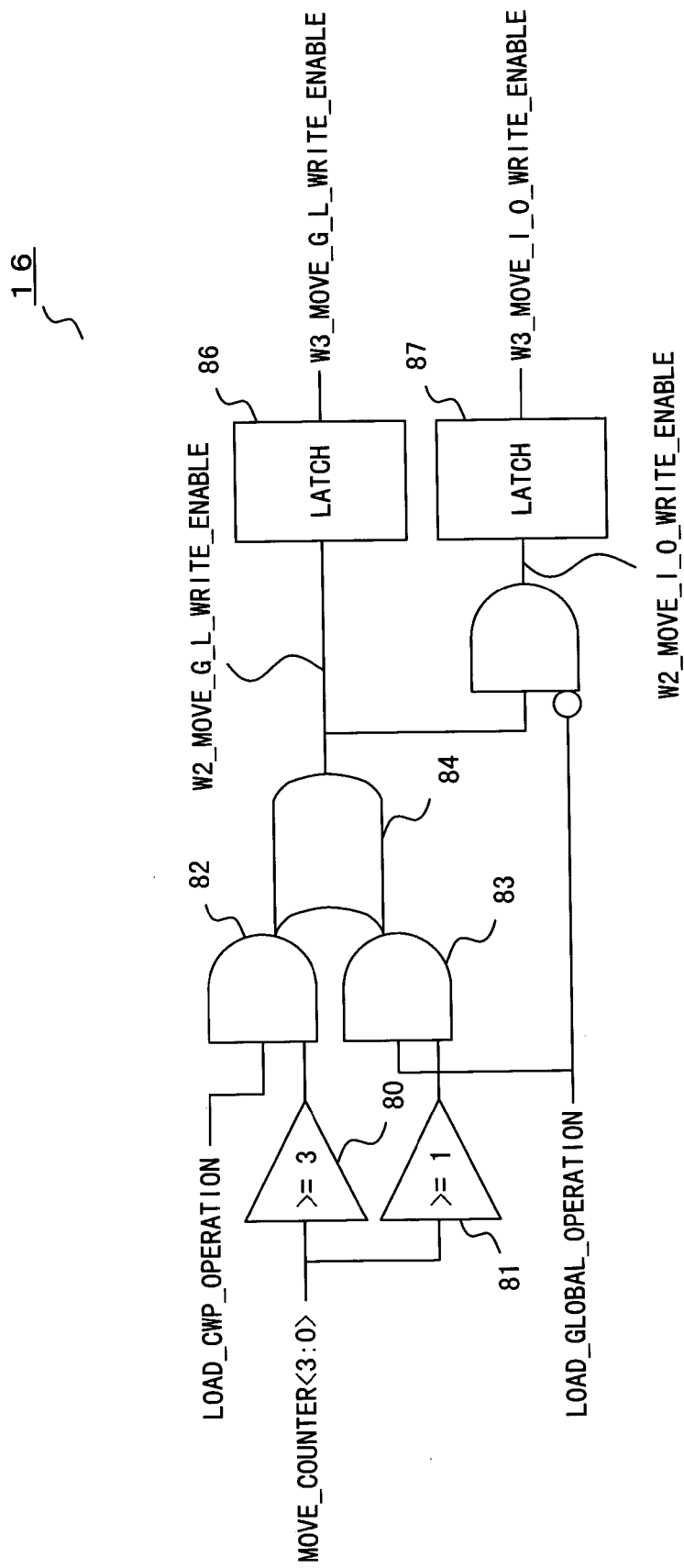
FIG. 7 illustrates a data writing control apparatus 16 according to the present embodiment.

FIG. 7 illustrates a data writing control apparatus 16 according to the present embodiment. The data writing control apparatus 16 is an apparatus controlling data writing in the JWR. The data writing control apparatus 16 consists of comparators 80 and 81; AND circuits 82 and 83; an OR circuit 84; a logic circuit (an AND circuit equipped with an inverter at one of the input terminals thereof) 85; and latch circuits 86 and 87.

In the comparators 80 and 81, MOVE_COUNTER_<3:0> is inputted. In the comparator 80, if MOVE_COUNTER_<3:0> is equal to or greater than 3 (indicating it is in the third cycle when the first data arrives at the JWR), a logic high is outputted therefrom, otherwise a low is outputted therefrom. In the comparator 81, if MOVE_COUNTER_<3:0> is equal to or greater than 1 (indicating it is in the first cycle when the first data arrives at the JWR), a logic high is outputted, otherwise a logic low is outputted therefrom. Note that the comparator 81 is equipped in the present embodiment for a purpose of confirmation, and therefore is practically optional.

In the AND circuit 82, LOAD_CWP_OPERATION signal and a signal outputted from the comparator 80 are inputted, and the logical product of these signals is outputted therefrom. In the AND circuit 83, LOAD_CWP_OPERATION signal and a signal outputted from the comparator 81 are inputted, and the logical product of these signals is outputted therefrom.

In the OR circuit 84, a signal outputted from the AND circuit 82 and a signal outputted from the AND circuit 83 are inputted, and the logical sum of these signals (W2_MOVE_G_L_WRITE_ENABLE signal) is outputted therefrom. In the AND circuit 85, LOAD_GLOBAL_OPERATION signal by way of the inverter and a signal outputted from the OR circuit 84 are inputted, and the logical product of these signals (W2_MOVE_I_O_WRITE_ENABLE signal) is outputted therefrom.

In the latch circuit 86, a signal outputted from the OR circuit 84 (W2_MOVE_G_L_WRITE_ENABLE signal) is inputted, and W3_MOVE_G_L_WRITE_ENABLE signal is outputted therefrom. In the latch circuit 87, a signal outputted from the OR circuit 85 (W2_MOVE_I_O_WRITE_ENABLE signal) is inputted, and W3_MOVE_I_O_WRITE_ENABLE signal is outputted therefrom.

By contriving as described above, in the case of LOAD_CWP, as shown in FIG. 9, the W3_MOVE_G_L_WRITE_ENABLE and W3_MOVE_I_O_WRITE_ENABLE signals are made logic high in transition from the cycle W5 to cycle W6 (MOVE_COUNTER_<3:0> being equal to or greater than 3) until these two signals are made logic low after receiving LOAD_CWP_OPERATION signal being logic low.

Meanwhile, in the case of LOAD_GLOBAL, as shown in FIG. 10, the W3_MOVE_G_L_WRITE_ENABLE signal is made logic high in transition from the cycle W3 to W4 (MOVE_COUNTER_<3:0> being equal to or greater than 1) until the signal is made logic low after receiving LOAD_CWP_OPERATION signal being logic low. In this instance, the W3_MOVE_I_O_WRITE_ENABLE signal is maintained logic low.

FIG. 8 illustrates an instruction release interlock control apparatus 14 according to the present embodiment. The instruction release interlock control apparatus 14 generates a signal (INSTRUCTION_RELEASE_INTLK) interlocking an instruction from the execution unit during a data transmission from the GPR to the JWR.

The instruction release interlock control apparatus 14 consists of an OR circuit 90, a comparator 91, a decrementer 92, and latch circuits 93 and 94.

In the OR circuit 90, LOAD_CWP and LOAD_GLOBAL signals are inputted, and the logical sum of these signals is outputted therefrom.

In the latch circuit 94, LOAD_CWP and LOAD_GLOBAL signals are inputted. If the LOAD_CWP signal is logic high, LOAD_CWP_COUNTER<3:0> is set with a numerical 10, and the LOAD_CWP_COUNTER<3:0> is decremented by the decrementer 92 cycle by cycle. Meanwhile, if LOAD_GLOBAL signal is logic high, LOAD_CWP_COUNTER<3:0> is set with a numerical 3, and the LOAD_CWP_COUNTER<3:0> is decremented by the decrementer 92 cycle by cycle.

In the comparator 91, when the number on the LOAD_CWP_COUNTER<3:0> is decremented and becomes zero after the LOAD_CWP_COUNTER<3:0> was set with a number, a logic high is outputted therefrom, otherwise a logic low is outputted therefrom.

In the latch circuit 93, a signal outputted from the OR circuit 90 and a signal outputted from the comparator 93 are inputted. If a signal outputted from the OR circuit 90 is logic high and a signal outputted from the comparator 93 is logic low, a signal outputted from the latch circuit 93 (INSTRUCTION_RELEASE_INTLK) is made logic high, whereas the INSTRUCTION_RELEASE_INTLK signal is made logic low when the LOAD_CWP_COUNTER<3:0> becomes 0 (zero).

By contriving as described above, INSTRUCTION_RELEASE_INTLK signal is maintained logic high, interlocking an instruction from the execution unit, during the data transmission (a duration of 11 cycles between W2 and W12 for LOAD_CWP; and a duration of 3 cycles between W2 and W4 for LOAD_GLOBAL), whereas at the completion of the data transmission the INSTRUCTION_RELEASE_INTLK signal is turned to logic low, enabling receiving an instruction from the execution unit, thus resuming to a processing.

Thus far, each apparatus constituting the data transmission control apparatus 11 has been described. Now referring to FIG. 9 and FIG. 10, a further examination is given for the case in which LOAD_CWP flag or LOAD_GLOBAL flag is raised, as follows.

In the case of FIG. 9, when LOAD_CWP becomes logic high (the cycle W1), LOAD_CWP_LCH becomes logic high (the cycle W2). Then, LOAD_CWP_OPERATION and MOVE_COUNTER_VALID become logic high (the cycle W3). Then, the number of cycles is counted up by MOVE_COUNTER <3:0>. In this instance, counting up 10 cycles starting from the cycle W3, then LOAD_CWP_OPERATION and MOVE_COUNTER_VALID are made logic low (at the cycle W13).

Then, in coincidence with MOVE_COUNTER<3:0>, 8 entries per cycle are selected in the order of CWP (in/out and local) at the MOVE_COUNTER<3:0> being equal to 2 and 3, CWP+1 (in/out and local) at 4 and 5, CWP−1 (in/out and local) at 6 and 7, and CWP+2 (in/out and global) at 8 and 9; and sent from the GPR to the JWR via the bus. Flags for writing in the JWR (W3_MOVE_G_L_WRITE_ENABLE and W3_MOVE_I_O_WRITE_ENABLE) a reset when MOVE_COUNTER <3:0> is equal to 3, and starting in the subsequent cycle, the writing in the JWR is performed in duration of 8 cycles. In other words, 11 cycles are required from raising a flag to completing the data transmission to the JWR (in which duration INSTRUCTION_RELEASE_INTLK is made logic high, interlocking an instruction from the execution unit).

Meanwhile, when a flag is raised for LOAD_GLOBAL according to the present embodiment, as shown in FIG. 10, the data transmission control signal, MOVE_GLOBAL_REG, for GLOBAL registers becomes logic high, the flag for writing in the JWR (W3_MOVE_G_L_WRITE_ENABLE) is set when MOVE_COUNTER<3:0> is equal to 1.

In this instance, since LOAD_CWP is interlocked by LOAD_GLOBAL, only GLOBAL registers are selected in the bus. Also, the write-enable flag for the in/out in the JWR is interlocked by LOAD_GLOBAL, and therefore the control is such that writing in only GLOBAL registers is executable.

Since writing in the JWR is performed in 2 cycles starting at 1 cycle after a write-enable flag is raised, the data transmission to the JWR is completed in 3 cycles after raising the LOAD_GLOBAL flag.

From the above, comparing between FIG. 9 and FIG. 10, the time for transmitting the data from the GPR and the JWR is shortened by 8 cycles (11 minus 3) for processing a trap other than the window-trap.

Note that the instruction interlocking signal (INSTRUCTION_RELEASE_INTLK) is created by the logical sum of LOAD_CWP and LOAD_GLOBAL (refer to the OR circuit 90 in FIG. 8). This signal is set at the cycle when the flag of either one of the above is raised, and reset in coincidence with a completion of the data transmission to the JWR. As such, the instruction interlocking time is shortened through the present embodiment by as many as 8 cycles, thereby improving the CPU performance.

As described above, the present invention makes it possible to transmit only the necessary data corresponding to the trap type occurring. The present invention further makes it possible to distinguish between a trap in which a data transmission only for the global registers is required, and a trap in which other data transmission is also required. The present invention still further makes it possible to transmit the data only for the global registers after the distinction as described above. The present invention yet further makes it possible to transmit only the necessary data corresponding to a trap type having occurred.

Consequently, in a general purpose register using a register window method, the present invention makes it possible to speed up the data transmission to the work registers at a trap occurrence, shorten the instruction interlocking time thusly being caused and substantially contribute to a performance improvement thereof.

What is claimed is:

1. A data processing apparatus using a register window method performing data transmission from a master register which is a group of registers holding a plurality of register windows, to a work register which is capable of holding a group of predefined number of register windows transmitted from the master register, transmitting a first data which is an amount of data required for the predefined number of register windows and a second data for global registers which are data commonly required for a data processing related to the predefined number of register windows during an exception handling, comprising:
    an acquisition unit for acquiring exception handling occurrence information indicating an occurrence of exception handling;
    a discrimination unit for discriminating said exception handling occurrence information; and
    a transmission control unit for controlling said data transmission such that when the exception handling does not cause a switching of register windows or does not initialize said work register, only said second data is transmitted, and in other exception handling, said first and second data are transmitted, according to a discrimination result by said discrimination unit.

2. The data processing apparatus according to claim 1, wherein said discrimination unit discriminates, based upon said exception handling occurrence information, whether or not switching a window, or initializing said work register, is required by the exception handling.

3. A data processing apparatus using a register window method, performing data transmission from a master register which is a group of registers holding a plurality of register windows, to a work register which is capable of holding a group of predefined number of register windows transmitted from the master register, transmitting a first data which is an amount of data required for the predefined number of register windows and a second data for global registers which are data commonly required for a data processing related to the predefined number of register windows during an exception handling, comprising:
    detection means for detecting exception handling occurrence information indicating an occurrence of exception handling;
    flag generation means for discriminating, based upon said exception handling occurrence information, whether or not switching a window, or initializing said work register, is required by the exception handling, and for generating a first flag information if switching a window, or initializing said work register, is not required by the exception handling, while generating a second flag information if other processing is required thereby; and
    data transmission timing control means for controlling so as to transmit only said second data if said first flag information is generated.

4. A data processing apparatus using a register window method performing data transmission from a master register which is a group of registers holding a plurality of register windows, to a work register which is capable of holding a group of a predetermined number of register windows transmitted from the master register, transmitting a first data which is an amount of data required for the predefined number of register windows and a second data for global registers which are data commonly required for a data processing related to the preferred number of register windows during an exception handling, comprising:
    a detection unit for detecting exception handling occurrence information indicating an occurrence of exception handling;
    a flag generation unit for discriminating said exception handling occurrence information, and for generating a flag information indicating the discrimination result; and
    a data transmission timing control unit for controlling said data transmission such that said first and second data are sequentially transmitted or only said second data is transmitted from said master register to said work register, based on said flag information.

5. The data processing apparatus according to claim 4, wherein said flag generation unit discriminates, based upon said exception handling occurrence information, whether or not switching a window, or initializing said work register, is required by the exception handling, and generates a first flag information if switching a window, or initializing said work register, is not required by the exception handling, while it generates a second flag information if other processing is required thereby.

6. The data processing apparatus according to claim 5, wherein said data transmission timing control unit transmits only said second data if said first flag information is generated.

7. A data processing apparatus using a register window method performing data transmission from a master register which is a group of registers holder a plurality of register windows, to a work register which is capable of holding a group of predetermined number of register windows transmitted from the master register, transmitting a first data which is an amount of data required for the predefined number of register windows and a second data for global registers which are data commonly required for a data processing related to the predefined number of register windows during an exception handling, comprising:

a detection unit for detecting exception handling occurrence information indicating an occurrence of exception handling;

a flag generation unit for discriminating, based upon said exception handling occurrence information, whether or not switching a window, or initializing said work register, is required by the exception handling, and for generating a first flag information if switching a window, or initializing said work register, is not required by the exception handling, while generating a second flag information if other processing is required thereby; and a data transmission timing control unit for controlling so as to transmit only said second data if said first flag information is generated.

8. The data processing apparatus according to claim 7, wherein said data transmission timing control unit controls so as to transmit said first and second if said second flag information is generated.

9. A data transmission control method for a data processing apparatus using a register window method performing data transmission from a master register which is a group of registers holding a plurality of register windows, to a work register which is capable of holding a group of predefined number of register windows transmitted from the master register, transmitting a first data which is an amount of data required for the predefined number of register windows and a second data for global registers which are data commonly required for data processing related to the predefined number of register windows during an exception handling, comprising:

acquiring exception handling occurrence information indicating an occurrence of exception handling;

discriminating said exception handling occurrence information; and controlling said data transmission such that when the exception handling does not cause a switching of register windows or does not initialize said work register, only said second data is transmitted, and in other exception handling, said first and second data are transmitted, according to the discrimination result.

10. The data transmission control method according to claim 9, wherein, based upon said exception handling occurrence information, whether or not switching a window, or initializing said work register, being required by the exception handling, is discriminated.

11. A data processing apparatus using a register window method performing data transmission from a master register to a work register which is a group of registers holding a plurality of register windows, to a work register which is capable of holding a group of a predefined number of register windows transmitted from the master register, transmitting a first data which is an amount of data required for the predefined number of register windows and a second data for global registers which are data commonly required for a data processing related to the predefined number of register windows during an exception handling, comprising:

detection means for detecting exception handling occurrence information indicating an occurrence of exception handling;

flag generation means for discriminating said exception handling occurrence information, and for generating a flag information indicating the discrimination result; and data transmission timing control means for controlling said data transmission such that said first and second data are sequentially transmitted or only said second data is transmitted from said master register to said work register, on said flag information.

12. A data transmission control method for a data processing apparatus using a register window method performing data transmission from a master register which is a group of registers holding a plurality of register windows, to a work register which is capable of holding a group of predefined number of register windows transmitted from the master register, transmitting a first data which is an amount of data required for the predefined number of register windows and a second data for global registers which are data commonly required for a data processing related to the predefined number of register windows during an exception handling, comprising:

detecting exception handling occurrence information indicating an occurrence of exception handling;

discriminating said exception handling occurrence information, and generating flag information indicating the discrimination result; and controlling said data transmission such that said first and second data are sequentially transmitted or only said second data is transmitted from said master register to said work register, based on said flag information.

13. The data transmission control method according to claim 12, wherein, in generating said flag information, based upon said exception handling occurrence information, it is discriminated whether or not switching a window, or initializing said work register, is required by the exception handling, and a first flag information is generated if switching a window, or initializing said work register, is not required by the exception handling, while a second flag information is generated if other processing is required thereby.

14. The data transmission control method according to claim 13, wherein only said second data are transmitted if said first flag information is generated.

15. A data transmission control method for a data processing apparatus using a register window method, performing data transmission from a master register which is a group of registers holding a plurality of register windows, to a work register which is capable of holding a group of a predefined number of register windows transmitted from the master register, transmitting a first data which is an amount of data required for the predefined number of register windows and a second data for global registers which are data commonly required for a data processing related to the predefined number of register windows during an exception handling, comprising:

detecting exception handling occurrence information indicating an occurrence of exception handling;

discriminating whether or not switching a window, or initializing said work register, is required by the exception handling based upon said exception handling occurrence information, generating a first flag information if switching a window, or initializing said work register, is not required by the exception handling, while generating a second flag information if other processing is required thereby; and controlling so as to transmit data only said second data said first flag information is generated.

16. The data transmission control method according to claim 15, wherein
control is so as to transmit said first and second data if said second flag information is generated.

17. A data processing apparatus using a register window method performing data transmission from a master register which is a group of registers holding a plurality of register windows, to a work register which is capable of holding a group of a predefined number of register windows transmitted from the master register, transmitting a first data which is an amount of data required for the predefined number of register windows and a second data for global registers which are data commonly required for a data processing related to the predefined number of register windows during an exception handling, comprising:

acquisition means for acquiring exception handling occurrence information indicating an occurrence of exception handling;

discrimination means for discriminating said exception handling occurrence information; and transmission control means for controlling said data transmission such that when the exception handling does not cause a switching of register windows or does not initialize said work register, only said second data is transmitted, and in other exception handling, said first and second data are transmitted, according to a discrimination result by said discrimination unit.

* * * * *

UNITED STATES PATENT AND TRADEMARK OFFICE
CERTIFICATE OF CORRECTION

| | |
|---|---|
| PATENT NO. | : 7,210,027 B2 |
| APPLICATION NO. | : 10/994401 |
| DATED | : April 24, 2007 |
| INVENTOR(S) | : Takshi Suzuki et al. |

It is certified that error appears in the above-identified patent and that said Letters Patent is hereby corrected as shown below:

Column 15, Line 24, after "second" insert --data--.

Column 16, Line 9, after "register," insert --based--.

Column 16, Line 67, before "said" insert --if--.

Signed and Sealed this

Twenty-eighth Day of August, 2007

JON W. DUDAS
*Director of the United States Patent and Trademark Office*